(12) United States Patent
Jalil et al.

(10) Patent No.: US 10,009,274 B2
(45) Date of Patent: Jun. 26, 2018

(54) DEVICE AND METHOD FOR COLLAPSED FORWARDING

(71) Applicant: Verizon Patent and Licensing Inc., Arlington, VA (US)

(72) Inventors: Luay Jalil, Allen, TX (US); David E. McDysan, Lahaina, HI (US); Rudy Gohringer, Tampa, FL (US); Michael Altland, Lebanon, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 110 days.

(21) Appl. No.: 15/274,274

(22) Filed: Sep. 23, 2016

(65) Prior Publication Data

US 2018/0091424 A1  Mar. 29, 2018

(51) Int. Cl.
*H04L 12/741* (2013.01)
*H04L 12/725* (2013.01)
*H04L 12/26* (2006.01)

(52) U.S. Cl.
CPC ........... *H04L 45/745* (2013.01); *H04L 43/16* (2013.01); *H04L 45/30* (2013.01)

(58) Field of Classification Search
None
See application file for complete search history.

(56) References Cited

U.S. PATENT DOCUMENTS

| 8,326,929 | B2 | 12/2012 | McDysan et al. |
| 8,520,680 | B1* | 8/2013 | Doshi ................. H04L 12/4662 370/389 |
| 8,699,488 | B2 | 4/2014 | McDysan et al. |
| 8,793,400 | B2 | 7/2014 | McDysan et al. |
| 9,001,671 | B2 | 4/2015 | McDysan et al. |
| 9,143,557 | B2* | 9/2015 | Guichard ............... H04L 67/16 |
| 9,356,866 | B1* | 5/2016 | Sivaramakrishnan ........................... H04L 45/7453 |
| 2013/0114613 | A1* | 5/2013 | Deshpande ........... H04L 45/586 370/401 |

OTHER PUBLICATIONS

Rosen et al., "Multiprotocol Label Switching Architecture," https://tools.ietf.org/html/rfc3031, Jan. 2001, 53 pages.
Wikipedia, "Multiprotocol Label Switching," https://en.wikipedia.org/wiki/Multiprotocol_Label_Switching, Apr. 13, 2016, 8 pages.

* cited by examiner

*Primary Examiner* — Hong Cho (57) ABSTRACT

A first routing instance may receive, from a second routing instance, forwarding information identifying a next-hop. The first routing instance may receive, via a component of the first routing instance, network traffic. The first routing instance may determine, based on the network traffic and the forwarding information, an interface to a component of the second routing instance. The first routing instance may provide, to the component of the second routing instance, the network traffic via the interface. The second routing instance may provide the network traffic to the next-hop.

20 Claims, 8 Drawing Sheets

DEVICE AND METHOD FOR COLLAPSED FORWARDING

BACKGROUND

The forwarding plane (e.g., the data plane) may refer to router architecture that determines a next-hop associated with a packet arriving on an inbound interface of a router. The forwarding plane may perform a lookup based on a destination address associated with an incoming packet, and may determine a path, through an internal forwarding fabric of the router, to a particular outgoing interface.

DETAILED DESCRIPTION OF PREFERRED EMBODIMENTS

The following detailed description of example implementations refers to the accompanying drawings. The same reference numbers in different drawings may identify the same or similar elements.

A control plane of a routing device may be partitioned into multiple control plane instances via software separation within a single processor card or a virtual machine (VM), by running separate control plane instances in separate processor cards or VMs, or the like. Additionally, each control plane instance may be allocated resources associated with data plane components (e.g., logical interfaces, line cards, partitions of a line card, VMs, etc.). A routing instance may include the combination of a control plane instance and one or more data plane components. Additionally, each data plane component, of a routing instance, may include a particular forwarding table, particular external interfaces (e.g., interfaces to a customer edge (CE) device, to a provider device, or the like), and/or particular internal interfaces (e.g., interfaces to other data plane components associated with the routing instance, interfaces to other data plane components associated with another routing instance, etc.).

In this way, separate routing devices (e.g., provider edge (PE) devices, provider devices, service edge devices, etc.) may be virtualized and/or consolidated within a single routing device (e.g., a multi-service edge (MSE) device), thereby enabling one routing device to function in more than one role, and thereby increasing flexibility, scalability, and efficiency. However, in some cases, the control plane of different routing instances may communicate at an aggregate level. For example, a first routing instance (e.g., a routing instance associated with a provider device) may broadcast forwarding information that broadcasts the first routing instance as a next-hop for a particular destination device, but fails to broadcast a particular data plane component of the first routing instance as the next-hop. In such cases, a second routing instance (e.g., a routing instance associated with a PE device) may receive network traffic destined for a destination device, may determine that a next-hop for the destination device is the first routing instance, may identify multiple interfaces (e.g., internal interfaces that correspond to different data plane components associated with the first routing instance) to reach the first routing instance, and may forward the network traffic to a particular data plane component of the first routing instance via a particular interface (e.g., a randomly determined internal interface).

However, in some cases, the particular data plane component of the first routing instance may not support an external interface that is able to reach the destination device, may not be associated with an external interface that is associated with a particular routing metric value (e.g., least cost, most available bandwidth, etc.), or the like. In such cases, the particular data component, of the first routing instance, may forward the network traffic, via an internal interface (e.g., across a switching fabric or a data center), to another data plane component of the first routing instance. For example, the other data plane component may be associated with an external interface that may reach the destination device, may be associated with a particular routing metric value (e.g., most available bandwidth, etc.), or the like. In such cases, the network traffic may traverse the internal switching fabric multiple times, thereby consuming processor and/or memory resources of routing instances, consuming network resources, increasing latency, etc.

Implementations described herein enable a first routing instance of an MSE device to provide, to a second routing instance of the MSE device, forwarding information that broadcasts a particular data plane component, and/or an interface associated with the particular data plane component, as a next-hop for a destination device. Additionally, implementations described herein enable the second routing instance to receive network traffic destined for the destination device, determine that the particular data plane component is the next-hop for the destination device, and forward the network traffic to the particular data plane component of the first routing instance via the interface. In this way, implementations described herein reduce inefficient forwarding by reducing an amount of internal switching fabric or data center network traversals, consume less processing power and/or memory resources and may reduce latency, etc.

Figure 1A:
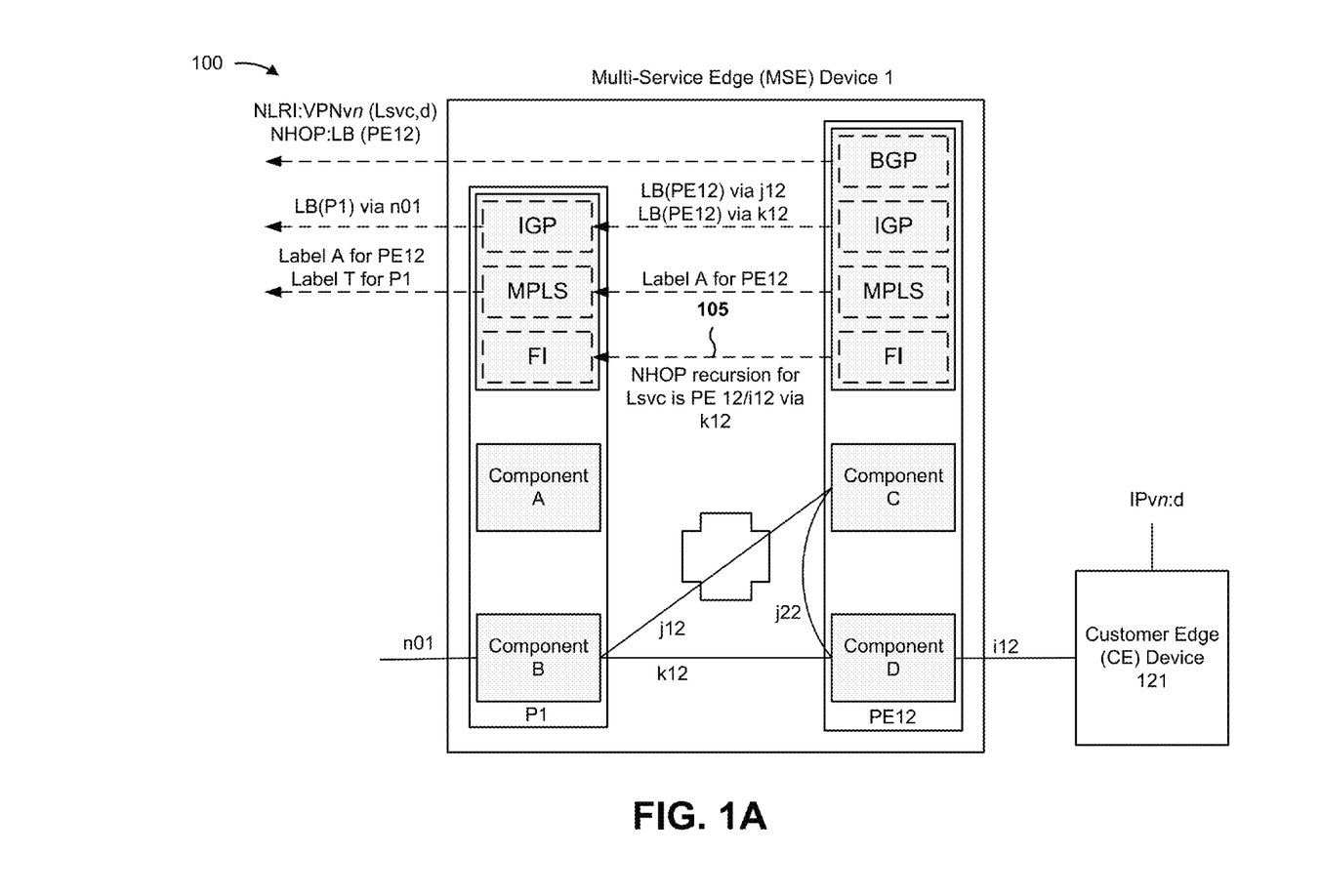
FIGS. 1A-1E are diagrams of an overview of an example implementation described herein.

FIGS. 1A-1E are diagrams of an overview of an example implementation 100 described herein. As shown in FIG. 1A, PE12 (e.g., a first routing instance) and P1 (e.g., a second routing instance), associated with MSE Device 1, may exchange control plane routing information (e.g., interior gateway protocol (IGP) information, multiprotocol label switching (MPLS) information, etc.). For example, as shown, PE12 may broadcast a label ("A") for PE12, and may broadcast that PE12 is reachable via a first internal interface ("j12") to Component C and/or a second internal interface ("k12") to Component D. Additionally, as shown by reference number 105, PE12 may provide forwarding information (FI) to P1. As an example, PE12 may broadcast that a next-hop recursion for a service label ("Lsvc") is PE12/i12 via k12. That is, PE12 may broadcast an output function (e.g., external interface i12) of a particular data plane component ("Component D") as the next-hop for the service label ("Lsvc"). Additionally, PE12 may broadcast that the particular data plane component ("Component D") is reachable via the second internal interface ("k12"). A next-hop recursion may refer to information that identifies a next-hop for a particular next-hop (e.g., a next-hop for PE12 may include a next-hop of PE12/i12 via k12).

Figure 1B:
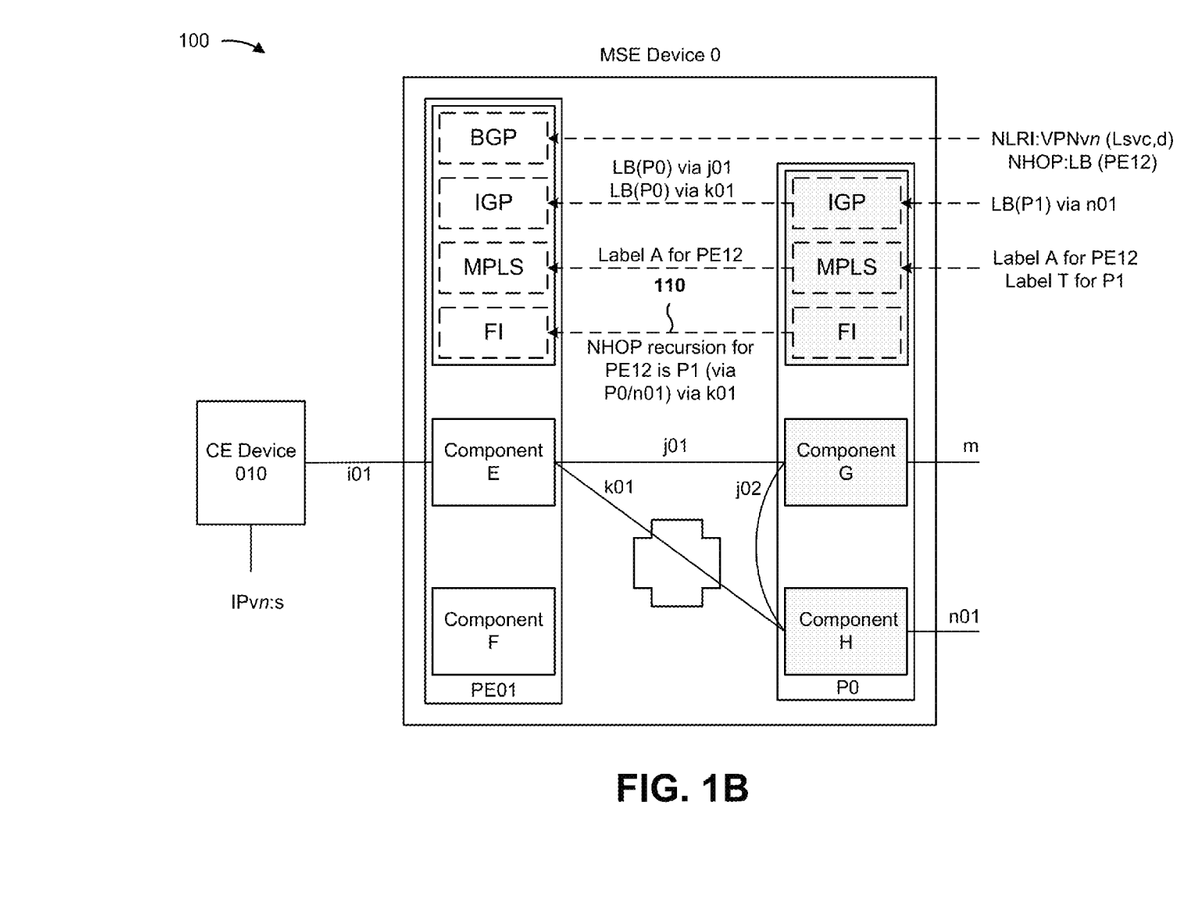

As further shown in FIG. 1A and FIG. 1B, P1 may provide control plane routing information to P0 (e.g., a third routing instance associated MSE Device 0) (as shown in FIG. 1B), that broadcasts the label ("A") for PE12, broadcasts a label ("T") for P1, and broadcasts that P1 is reachable via an external interface ("n01"). Additionally, as shown in FIG. 1A, PE12 may exchange control plane routing information (e.g., border gateway protocol (BGP) information, etc.) with PE01 (e.g., a fourth routing instance associated with MSE Device 0). For example, PE12 may broadcast network layer reachability information (NLRI) such as Virtual Private Network (VPN) version n prefixes (e.g., VPNvn, where n=4, 6, etc.) and label information. For example, PE12 may broadcast the service label (Lsvc) for particular VPNvn prefixes.

As shown in FIG. 1B, PE01 may receive, from PE12, the NLRI, and may populate a forwarding table (e.g., a forwarding information base (FIB) table, a label forwarding information base (LFIB) table, and/or the like). Additionally, as shown, P0 may exchange control plane routing information with PE01. As shown by reference number 110, P0 may provide forwarding information (FI) to PE01. As an example, P0 may broadcast that a next-hop recursion for PE12 is P0/n01 via k01. That is, P0 may broadcast an output function (e.g., external interface n01) of a particular data plane component ("Component H") as the next-hop for PE12. Additionally, P0 may broadcast that the particular data plane component ("Component H") is reachable via an internal interface (k01).

Figure 1C:
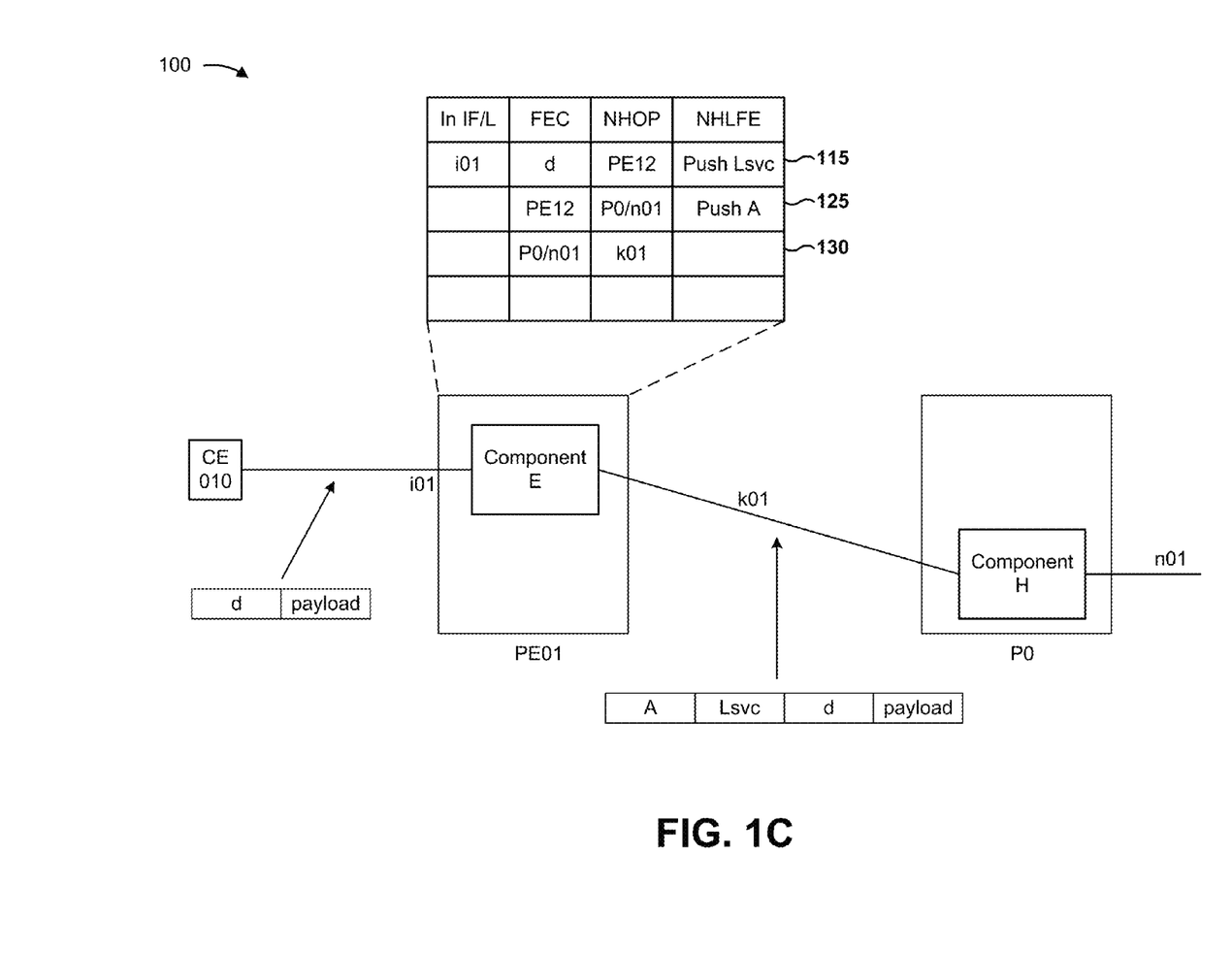
Figure 1D:
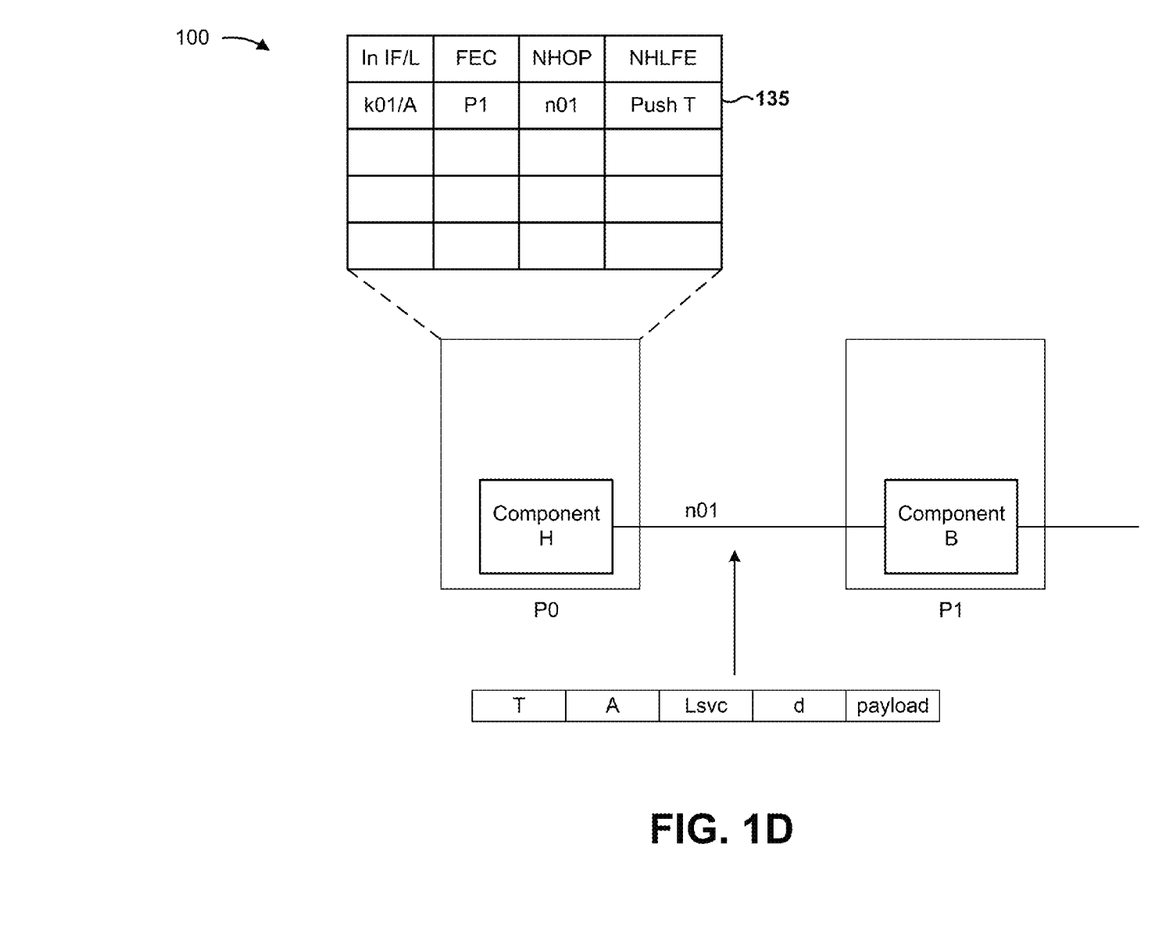
Figure 1E:
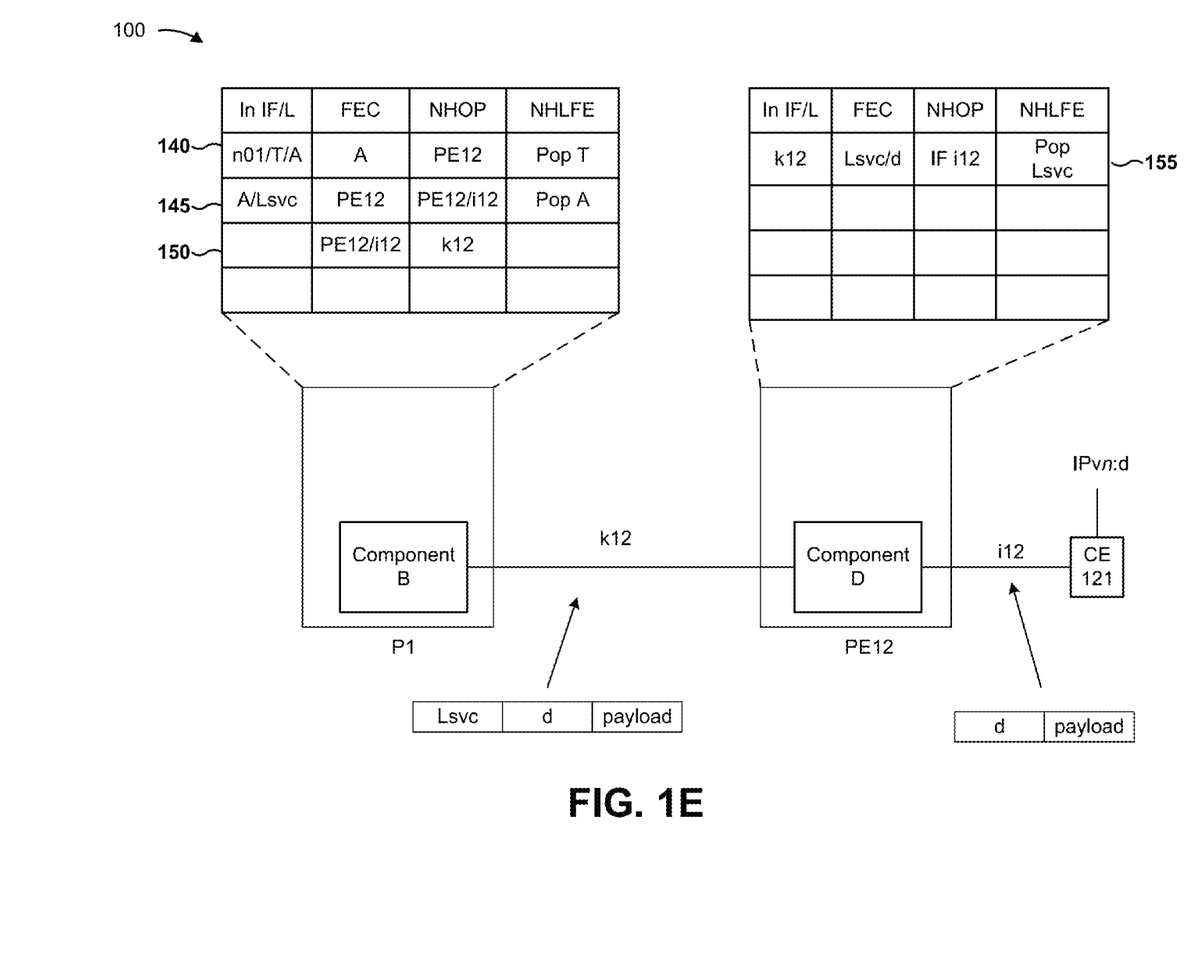

As shown in FIG. 1C, a particular data plane component ("Component E") of PE01 may receive network traffic (e.g., a packet) from CE Device 010 via an external interface ("i01"). As shown, the packet may include an internet protocol (IP) header and a payload. As an example, the IP header may include a destination address ("d"). As an example, and as shown in FIGS. 1C-1E, various forwarding tables of various components may map incoming interfaces and/or labels with particular next-hop label forwarding entries (NHLFEs), and/or may map forward equivalence classes (FECs) to an NHLFE. As shown in FIG. 1C, Component E of PE01 may perform recursive lookups (e.g., a sequence of lookups). For example, as shown in FIG. 1C, and by reference number 115, Component E of PE01 may perform a first lookup in a forwarding table, and may determine, that a next-hop for a FEC associated with the destination address ("d") is PE12, and an NHFLE operation (e.g., push a service label ("Lsvc")).

Additionally, as shown by reference number 125, Component E of PE01 may perform a second lookup in the forwarding table, and may determine, based on an FEC for PE12, that a next-hop is P0/n01, and an NHLFE operation (e.g., push a label ("A")). Additionally, as shown by reference number 130, Component E of PE01 may perform a third lookup in the forwarding table, and may determine that a next-hop for P0/n01 is a particular internal interface ("k01"). As shown, Component E of PE01 may forward the packet to Component H of P0 via the internal interface ("k01") (e.g., the NHLFE operation is null). In this way, an amount of internal switching fabric traversals may be reduced to a single traversal, which is the most efficient possible, thereby conserving processor and/or memory resources of PE01 and P0, and conserving network resources (e.g., router switching fabric, data center network, or the like). As an example, assume that P0 did not exchange the forwarding information (FI) with PE01 that broadcasted the next-hop recursion for PE12. In this case, Component E of PE01 may have determined two potential next-hops for PE12 (e.g., Component G via j01 and Component H via k01). Additionally, assume that Component E of PE01 forwarded the packet to Component G of P0 via j01. In this case, Component G may have performed a lookup in a forwarding table, and may have determined a next-hop of Component H via j02. As an example, assume that an external interface ("m") of Component G is incapable of reaching PE12, and/or that the external interface ("m") is associated with a particular routing metric value (e.g., less available bandwidth than as compared to the external interface of Component H ("n01")). In this case, Component G may forward the packet to Component H via an internal interface ("j02"), thereby causing multiple (e.g., two, more than two, etc.) internal switching fabric traversals, and thereby consuming device and network resources.

As shown in FIG. 1D, Component H of P0 may receive the packet, and may perform a lookup in a forwarding table. As shown by reference number 135, Component H may determine, based on the incoming interface ("k01"), label ("A"), and the FEC ("P1"), a next-hop of external interface ("n01") and an NHLFE operation (e.g., push a transport label ("T")). As shown, P0 may forward the packet to Component B of P1.

As shown in FIG. 1E, Component B of P1 may receive, from Component H of P0, the packet and may perform recursive lookups. For example, as shown by reference number 140, Component B may perform a first lookup in a forwarding table and may determine a next-hop of PE12 and an NHLFE operation (e.g., pop the transport label ("T")) based on an incoming interface and/or labels (e.g., "n01/T/A") and/or an FEC associated with a label ("A"). As shown by reference number 145, Component B may perform a second lookup and may determine a next-hop of PE12/i12 and an NHLFE operation (e.g., pop the label ("A")) based on an incoming interface and/or labels (e.g., "A/Lsvc") and/or an FEC associated with PE12. As shown by reference number 150, Component B may perform a third lookup and may determine an internal interface next-hop of k12 based on an FEC associated with PE12/i12. As shown, Component B may forward the packet to Component D via the internal interface ("k12").

As shown, Component D may receive, from Component B, the packet via the internal interface ("k12"). In this way, an amount of internal switching fabric traversals may be reduced, thereby conserving processor and/or memory resources of P1 and PE12, and conserving network resources. For example, the amount of internal switching fabric traversals may be reduced for similar reasons as discussed in connection with FIG. 1C. As shown by reference number 155, Component D may perform a lookup and may determine an external interface ("i12") next-hop and an NHLFE operation (e.g., pop the service label ("Lsvc") based on an incoming interface and/or label (e.g., "k12") and/or an FEC associated with PE12. As shown, Component D may provide, to CE 121, the packet via the external interface ("i12").

Implementations described herein enable a first routing instance to provide, to a second routing instance, forwarding information that identifies a particular data plane component and/or an interface to the particular data plane component for which the second routing instance is to forward network traffic. In this way, implementations described herein enable the second routing instance to provide network traffic to a particular data plane component of the first routing instance that supports an interface associated with a next-hop, that includes an interface that is associated with a particular routing metric value, or the like, thereby reducing the amount of multiple switching fabric traversals. In this way, implementations described herein may conserve processor and/or memory resources of routing devices, may reduce latency, and/or may conserve network resources such as memory and processor resources.

As indicated above, FIGS. 1A-1E are provided merely as an example. Other examples are possible and may differ from what was described with regard to FIGS. 1A-1E.

Figure 2:
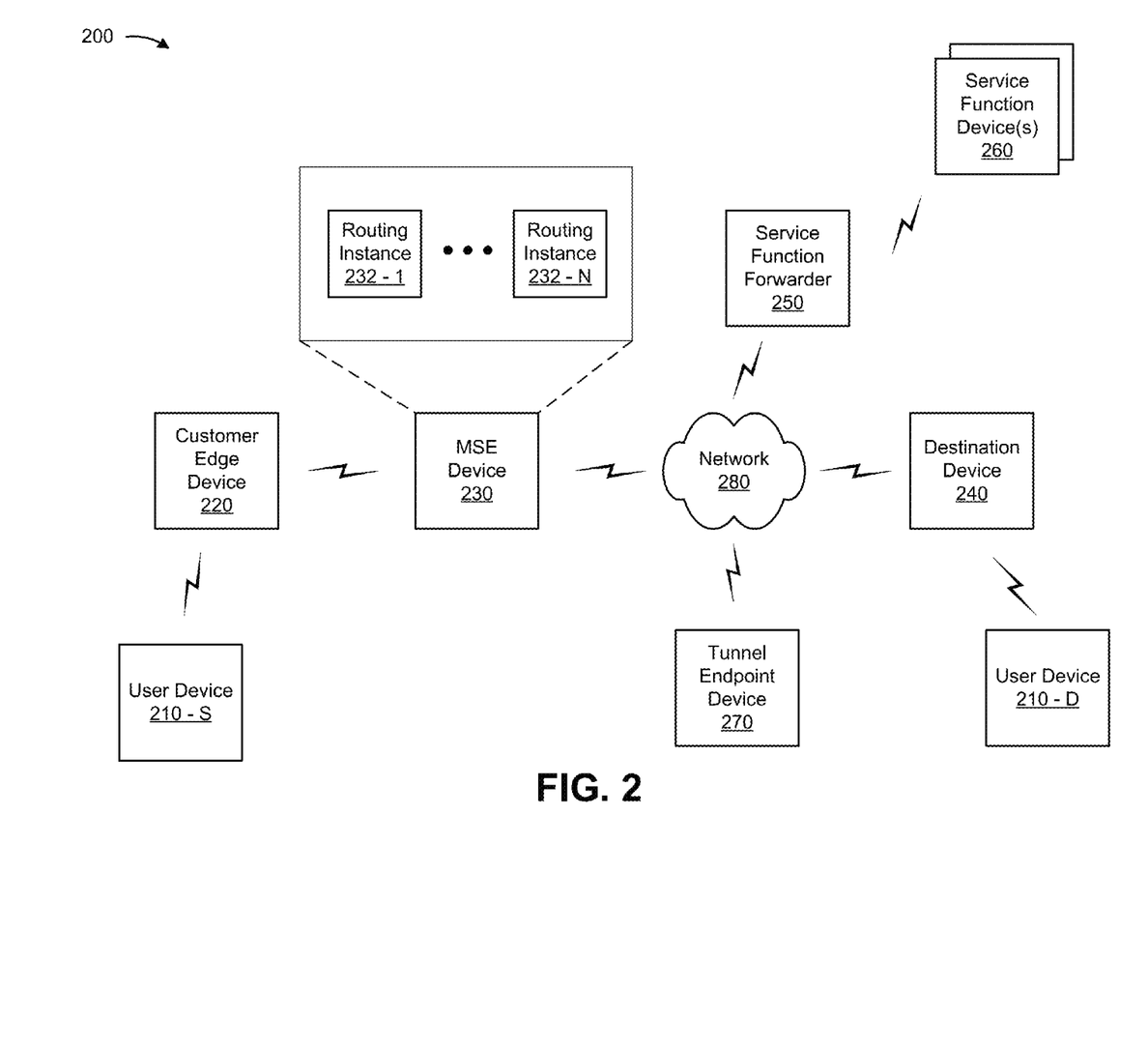
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210-S (e.g., a source user device 210) and user device 210-D (e.g., a destination user device 210) (hereinafter referred to collectively as "user devices 210," and individually as "user device 210"), a CE device 220, an MSE device 230, a destination device 240, a service function forwarder 250, one or more service function devices 260 (hereinafter referred to collectively as "service function devices 260," and individually as "service function device 260"), a tunnel endpoint device 270, and a network 280. Devices of environment 200 may interconnect via wired connections, wireless connections, or a combination of wired and wireless connections.

User device 210 includes one or more devices capable of receiving, generating, storing, processing, and/or providing network traffic (e.g., packets). For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device.

As used herein, a packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

Customer edge device 220 includes one or more network devices (e.g., one or more traffic transfer devices) capable of processing and transferring network traffic. For example, customer edge device 220 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, customer edge device 220 may receive network traffic from user device 210 (e.g., user device 210-S), and may forward the network traffic to MSE device 230.

MSE device 230 includes one or more network devices (e.g., one or more traffic transfer devices) capable of processing and transferring network traffic. For example, MSE device 230 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device.

In some implementations, MSE device 230 may include routing instance 232-1 through 232-N (N>1). In some implementations, a routing instance may be associated with a particular functionality. For example, a particular routing instance 232-1 may include provider edge functionality (e.g., associated with providing and/or receiving network traffic to and/or from customer edge device 220), provider functionality (e.g., associated with forwarding network traffic through a core network), specialized service edge functionality (e.g., associated with providing and/or receiving network traffic to and/or from service function forwarder 250 and/or service function device 260), or the like. A routing instance 232 is implemented at least partially in hardware. In some implementations, routing instances 232 may include one or more components (e.g., data plane components, such as input components, output components, and/or switching components, as described in connection with FIG. 3), and/or control plane components (e.g., associated with a controller, as described in connection with FIG. 3).

Destination device 240 includes one or more network devices (e.g., one or more traffic transfer devices) capable of processing and transferring network traffic. For example, destination device 240 may include a router, a gateway, a switch, a firewall, a hub, a bridge, a reverse proxy, a server (e.g., a proxy server, a server executing a virtual machine, etc.), a security device, a CE device, an intrusion detection device, a load balancer, a line card (e.g., in a chassis-based system), or a similar type of device. In some implementations, destination device 240 may receive network traffic from MSE device 230, and may forward the network traffic to user device 210 (e.g., user device 210-D).

Service function forwarder 250 includes one or more network devices (e.g., one or more traffic transfer devices) capable of processing and transferring network traffic. For example, service function forwarder 250 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. For example, service function forwarder 250 may forward network traffic to one or more service function devices 260 based on information associated with a service function chain (SFC) (e.g., based on information associated with a network service header (NSH)).

Service function device 260 includes one or more network devices (e.g., one or more traffic transfer devices) capable of processing and transferring network traffic. For example, service function device 260 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, service function device 260 may perform packet/application flow services/features, such as content-related services, security-related services, flow, rate, and Quality of Service (QoS)-related features, statistics, collection and accounting-related services, administrative-related services, or the like.

Tunnel endpoint device 270 includes one or more network devices (e.g., one or more traffic transfer devices) capable of processing and transferring network traffic. For example, tunnel endpoint device 270 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, tunnel endpoint device 270 (e.g., a virtual extensible local area network (VXLAN) tunnel end point (VTEP), or the like) may be associated with a source or a destination of a tunnel (e.g., a VXLAN tunnel, a VLAN tunnel, a generic routing encapsulation (GRE) tunnel, or the like).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
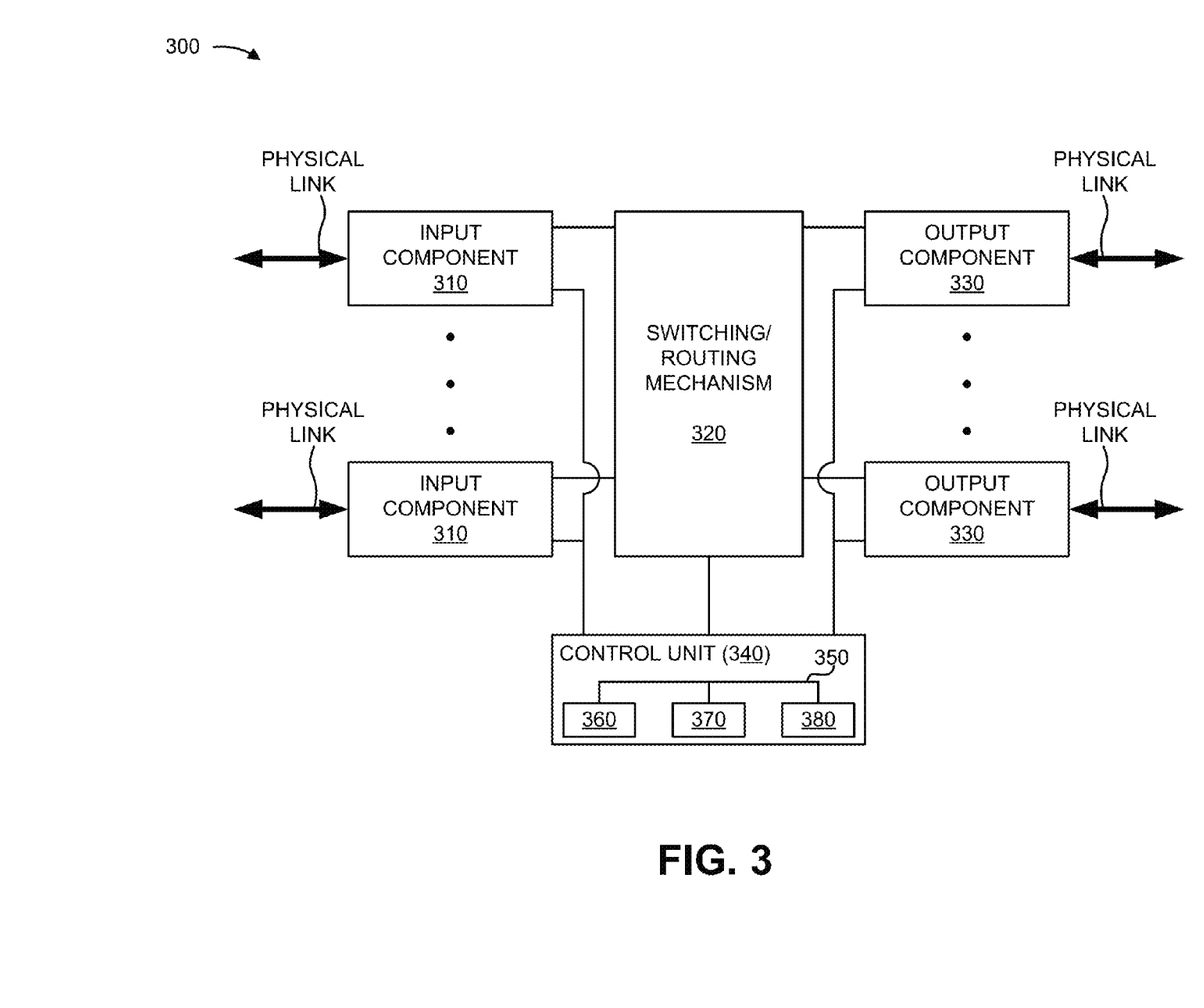
FIG. 3 is a diagram of example components of a network device of FIG. 2.

FIG. 3 is a diagram of example components of a device 300. Device 300 may correspond to customer edge device 220, MSE device 230, destination device 240, service function forwarder 250, service function device 260, and/or tunnel endpoint device 270. In some implementations, customer edge device 220, MSE device 230, destination device 240, service function forwarder 250, service function device 260, and/or tunnel endpoint device 270 may include one or more devices 300 and/or one or more components of device 300. As shown in FIG. 3, device 300 may include input components 310, a switching/routing mechanism 320, output components 330, and a control unit 340.

Input components 310 may be a point of attachment for physical or logical (e.g., VLAN, pseudowire, VTEP, or the like) links and may be a point of entry for incoming traffic, such as packets. Input components 310 may process incoming traffic, such as by performing data link layer encapsulation or decapsulation, matching on specific sets of packet header fields, taking certain actions, implementing a table of functions, etc. In an example implementation, input components 310 may send and/or receive packets. In some implementations, input components 310 may include a VM, a container, a standalone application running on an operating system, or the like.

Switching/routing mechanism 320 may interconnect input components 310 with output components 330. Switching/routing mechanism 320 may be implemented using many different techniques. For example, switching/routing mechanism 320 may be implemented via busses, via crossbars, and/or with shared memories. The shared memories may act as temporary buffers to store traffic from input components 310 before the traffic is eventually scheduled for delivery to output components 330. In some implementations, switching/routing mechanism 320 may include an underlay network associated with a data center.

Output components 330 may store packets and may schedule packets for service on output physical or logical links. Output components 330 may include scheduling algorithms that support priorities and guarantees. Output components 330 may support data link layer encapsulation and decapsulation, and/or a variety of higher-level protocols. In an example implementation, output components 330 may send packets, receive packets, match on specific sets of packet header fields, take certain actions, implement a table of functions, etc.

Control unit 340 may use routing protocols and one or more routing tables for programming and/or configuring components to forward packets. Control unit 340 may connect with input components 310, switching/routing mechanism 320, and output components 330. Control unit 340 may compute a forwarding table, program and/or configure components, implement routing protocols, and/or run software to configure and manage device 300. Control unit 340 may determine routing for any packet whose destination address may not be found in the forwarding table.

In an example implementation, control unit 340 may include a bus 350 that may include a path that permits communication among a processor 360, a memory 370, and a communication interface 380. Processor 360 may include one or more processors, microprocessors, ASICs, FPGAs, or other types of processing units that may interpret and execute instructions. Memory 370 may include a RAM, a ROM device, a magnetic and/or optical recording medium and its corresponding drive, and/or another type of static and/or dynamic storage device that may store information and instructions for execution by processor 360. Memory 370 may also temporarily store incoming traffic (e.g., a header of a packet, an entire packet, or a set of packets) from input components 310, for processing by processor 360, before a packet, or a set of packets, is directed back to switching/routing mechanism 320, transported by switching/routing mechanism 320, and eventually scheduled to be sent to output components 330. Communication interface 380 may include any transceiver-like mechanism that enables control unit 340 to communicate with other devices and/or systems (e.g., OFC 220).

As described herein, device 300 may perform certain operations in response to processor 360 executing software instructions contained in a computer-readable medium, such as memory 370. The software instructions may be read into memory 370 from another computer-readable medium, such as a data storage device, or from another device via communication interface 380. The software instructions contained in memory 370 may cause processor 360 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
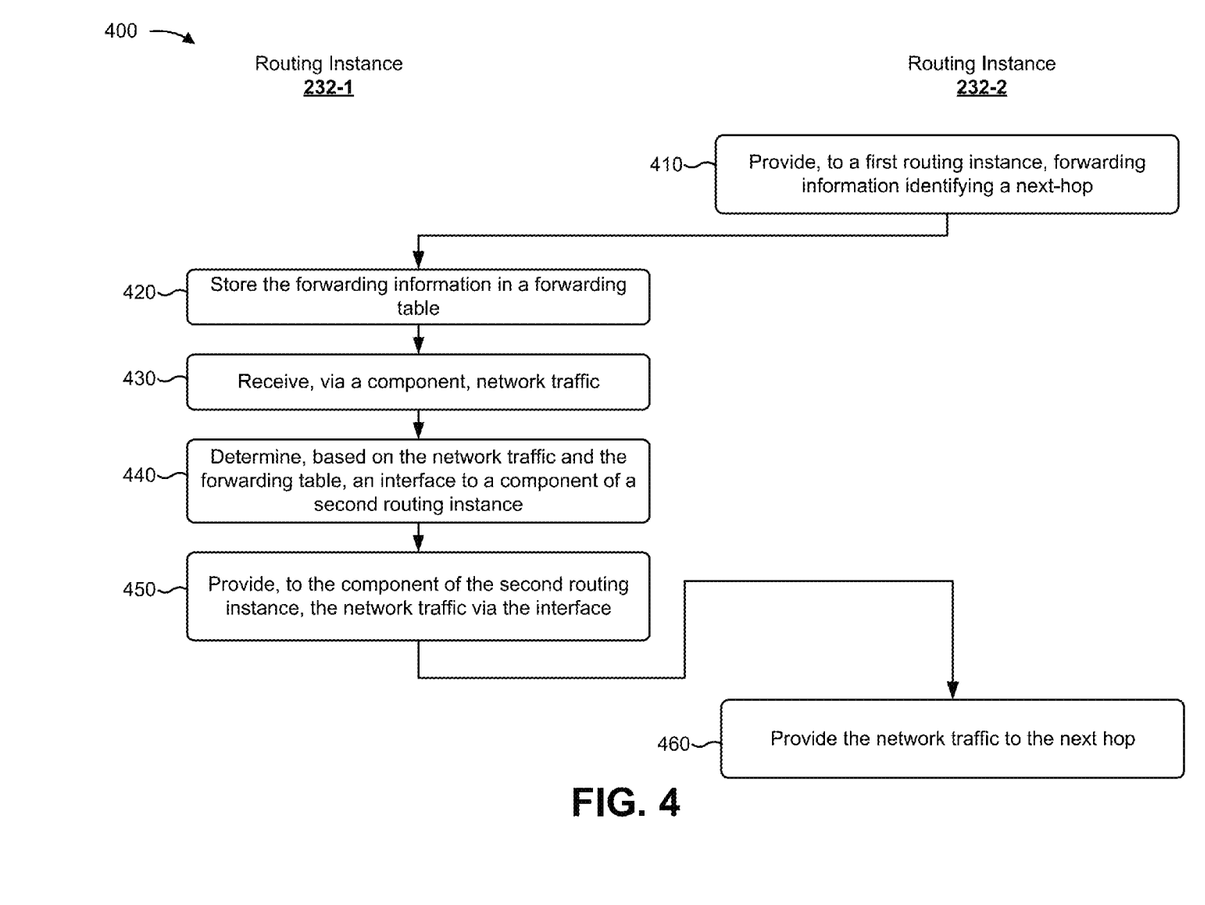
FIG. 4 is a flow chart of an example process for providing forwarding information that identifies a component associated with a routing instance.

FIG. 4 is a flow chart of an example process 400 for providing forwarding information that identifies a component associated with a routing instance. In some implementations, one or more process blocks of FIG. 4 may be performed by routing instance 232-1 and/or routing instance 232-2. In some implementations, one or more process blocks of FIG. 4 may be performed by another device or a group of devices separate from or including routing instance 232-1 and/or routing instance 232-2, such as user device 210, customer edge device 220, MSE device 230, destination device 240, service function forwarder 250, service function device 260 and/or tunnel endpoint device 270.

As shown in FIG. 4, process 400 may include providing, to a first routing instance, forwarding information identifying a next-hop (block 410), and storing the forwarding information in a forwarding table (block 420). For example, routing instance 232-2 may provide, to routing instance 232-1, forwarding information that identifies a next-hop. In some implementations, forwarding information may include information that identifies a particular interface, associated with routing instance 232-1 and routing instance 232-2, for which routing instance 232-1 is to forward network traffic associated with a next-hop. Additionally, or alternatively, the forwarding information may include information that identifies a particular component of routing instance 232-2 to which routing instance 232-1 is to forward network traffic associated with a next-hop. Additionally, or alternatively, the forwarding information may include information that identifies a particular output function of a particular component of routing instance 232-2. As an example, an output function may identify an external interface, and/or may identify an entry in a forwarding table of the particular component of routing instance 232-2.

In some implementations, routing instance 232-2 may determine that a particular component of routing instance 232-2 is associated with a routing metric value that satisfies a threshold, and may provide forwarding information that identifies the particular component based on the routing metric value satisfying the threshold. For example, a routing metric value may include a bandwidth (e.g., link capacity, link utilization, etc.) value, a latency value, a packet loss value, a jitter value, a reliability value, a load value, a cost value, a maximum transmission unit (MTU) size value, or the like. In some implementations, routing instance 232-2 may compare first values, associated with routing metrics of a first component, and second values associated with routing metrics of a second component, and may provide forwarding information that identifies the first component based on the first values satisfying the second values.

Additionally, or alternatively, routing instance 232-2 may determine that a particular component is the only component that includes an interface to another device, and may provide the forwarding information based on the particular component being the only component that includes an interface to the other device.

In this way, routing instance 232-2 may reduce an amount of internal switching fabric or data center network traversals based on providing forwarding information that identifies a component associated with particular routing metric values. As an example, a particular component of routing instance 232-2 may receive network traffic from routing instance 232-1 and may forward the network traffic to another device, without first forwarding the network traffic to another component of routing instance 232-1.

In some implementations, the forwarding information may identify a next-hop from the perspective of routing instance 232-2. As an example, assume that the following represents a general sequence of hops: $Node_{n-1}$, $Node_n$, $Node_{n+1}$, etc. In this case, routing instance 232-2 may represent $Node_n$, and routing instance 232-1 may represent $Node_{n-1}$, and the next-hop from the perspective of routing instance 232-2 may represent $Node_{n+1}$. For example, the forwarding information may identify a next-hop associated with destination device 240. For example, destination device 240 (e.g., a customer edge device) may provide control plane routing information (e.g., NLRI, etc.) to routing instance 232-1 that broadcasts destination device 240 as a next-hop for particular destination addresses (e.g., associated with an IP prefix or prefixes). Additionally, or alternatively, routing instance 232-2 may provide forwarding information that broadcasts a particular component of routing instance 232-2 as a next-hop for destination device 240. For example, routing instance 232-2 may provide forwarding information in a similar manner as described above in connection with FIG. 1A and/or FIG. 1B.

In some implementations, the forwarding information may identify multiple next-hops from the perspective of routing instance 232-2 (e.g., $Node_{n+1}$, $Node_{n+2}$, $Node_{n+3}$, $Node_{n+4}$, etc.). In some implementations, the forwarding information may identify a next-hop associated with service function device 260. For example, the forwarding information may identify that a next-hop for service function device 260 is service function forwarder 250. Additionally, or alternatively, the forwarding information may identify that a next-hop for service function forwarder 250 is routing instance 232-2. Additionally, or alternatively, the forwarding information may identify that the next-hop for service function forwarder 250 is a particular component of routing instance 232-2 and/or is a particular interface associated with routing instance 232-1 and routing instance 232-2.

As another example, the forwarding information may identify a next-hop associated with tunnel endpoint device 270. For example, the forwarding information may identify that a next-hop associated with an endpoint of a tunnel (e.g., tunnel endpoint device 270) is a source of the tunnel (e.g., another tunnel endpoint device 270). Additionally, or alternatively, the forwarding information may identify that a next-hop for the source of the tunnel is routing instance 232-2, is a particular component of routing instance 232-2, and/or is a particular interface associated with routing instance 232-1 and routing instance 232-2.

In some implementations, routing instance 232-1 may receive the forwarding information and/or label information, and may store the forwarding information in a forwarding table (e.g., a FIB table, a LFIB table, or the like). For example, routing instance 232-1 may populate forwarding tables associated with components of routing instance 232-1 based on the forwarding information. In some implementations, routing instance 232-1 may populate forwarding tables based on the forwarding information that identifies a next-hop, and/or multiple recursively determined next-hops (e.g., $Node_{n+1}$, $Node_{n+2}$, $Node_{n+3}$, $Node_{n+4}$, etc.). In this way, routing instance 232-1 may receive network traffic, and perform one or more lookups (e.g., recursive lookups) based on the next-hop or multiple next-hops, as described elsewhere herein.

As further shown in FIG. 4, process 400 may include receiving, via a component, network traffic (block 430), determining, based on the network traffic and the forwarding table, an interface to a component of a second routing instance (block 440), and providing, to the component of the second routing instance, the network traffic via the interface (block 450). For example, a particular component of routing instance 232-1 may receive, from customer edge device 220, network traffic, and may determine, based on the network traffic and the forwarding table, an interface to a component of routing instance 232-2. In some implementations, an input component of routing instance 232-1 may forward the network traffic to an output component associated with routing instance 232-2. For example, an input component of routing instance 232-1 may identify an internal interface associated with routing instance 232-2 and/or may identify a particular entry in a forwarding table of routing instance 232-2.

In some implementations, routing instance 232-1 (e.g., a particular component of routing instance 232-1) may receive network traffic, and may determine address information based on the network traffic (e.g., may identify a source IP address, source media access control (MAC) address, destination IP address, destination MAC address, VTEP, SFC, etc.). Additionally, or alternatively, routing instance 232-1 may determine a next-hop based on the address information. For example, routing instance 232-1 may perform a lookup in a forwarding table, and may identify a next-hop based on the address information, based on five-tuple information, or the like.

In some implementations, routing instance 232-1 may perform recursive lookups based on the network traffic. For example, routing instance 232-1 may perform a first lookup, and may determine a first next-hop associated with destination device 240. Additionally, routing instance 232-1 may perform a second lookup based on the first next-hop, and may determine a second next-hop associated with routing instance 232-2. For example, the second next-hop may identify a particular component of routing instance 232-2 (e.g., a component that supports an external interface to destination device 240). Additionally, routing instance 232-1 may perform a third lookup based on the second next-hop, and may determine a third next-hop associated with routing instance 232-2. For example, the third next-hop may identify a particular interface, associated with routing instance 232-1 and 232-2, for which routing instance 232-1 is to forward the network traffic. As an example, the third next-hop may identify an interface associated with a component of routing instance 232-1 and a component of routing instance 232-2. In some implementations, routing instance 232-1 may forward the network traffic to routing instance 232-2 via the interface associated with the third next-hop. As an example, routing instance 232-1 may determine the first, second, and/or third next-hops in a similar manner as described above in connection with FIGS. 1A-1E.

In some implementations, routing instance 232-1 may perform a first lookup, and may determine a first next-hop associated with service function device 260. For example, routing instance 232-1 may determine, based on address information, that the network traffic includes subscribed services (e.g., as part of a service function chain), and may determine that the next-hop is service function device 260. Additionally, routing instance 232-1 may perform a second lookup based on the first next-hop, and may determine a second next-hop associated with service function forwarder 250. Additionally, routing instance 232-1 may perform a third lookup based on the second next-hop and may determine a third next-hop associated with routing instance 232-2. Additionally, routing instance 232-1 may perform a fourth lookup based on the third next-hop and may determine a fourth next-hop associated with a particular component of routing instance 232-2. Additionally, routing instance 232-1 may perform a fifth lookup based on the fourth next-hop, and may determine a fifth next-hop associated with a particular interface, associated with routing instance 232-1 and 232-2, for which routing instance 232-1 is to forward the network traffic. As an example, the fifth next-hop may identify an interface associated with a component of routing instance 232-1 and a component of routing instance 232-2. In some implementations, routing instance 232-1 may forward the network traffic to routing instance 232-2 via the interface associated with the fifth next-hop.

In some implementations, routing instance 232-1 may perform similar recursive lookups based on receiving network traffic destined for tunnel endpoint device 270. In some implementations, routing instance 232-1 may perform a particular number of recursive lookups based on the number of next-hops from the perspective of routing instance 232-1 and/or routing instance 232-2 (e.g., $Node_{n+1}$, $Node_{n+2}$, $Node_{n+3}$, $Node_{n+4}$, etc.). In this way, routing instance 232-1 may perform recursive lookups, and may determine a particular next-hop associated with an interface of routing instance 232-1 and routing instance 232-2. Additionally, in this way, routing instance 232-1 may provide the network traffic to a particular component of routing instance 232-2 (e.g., a component that supports one or more next-hops from the perspective of routing instance 232-2), thereby reducing an amount of internal switching fabric or data center network traversals.

In some implementations, routing instance 232-1 may also modify the packet by performing a function, such as label processing (NHLFE), encapsulation, decapsulation, priority marking, packet header rewrite (e.g., NSH), or other functions as part of providing the network traffic to an interface.

As further shown in FIG. 4, process 400 may include providing the network traffic to the next-hop. For example, a particular component of routing instance 232-2 may receive the network traffic via a particular interface, may perform a lookup, identify a next-hop, and may forward the traffic to the next-hop. In this way, routing instance 232-2 may forward the network traffic without first forwarding the network traffic to another component of routing instance 232-2 via an internal switching fabric (e.g., another component that includes a greater routing metric value, another component that includes an interface to the next-hop, etc.). In this way, routing instance 232-2 may reduce an amount of internal switching fabric traversals, thereby conserving processor and/or memory resources, and/or network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable a first routing instance to provide, to a second routing instance, forwarding information that identifies a particular component of the first routing instance as a next-hop for network traffic, and that identifies a particular physical or logical interface for which the second routing instance is to forward the network traffic. Implementations described herein enable the first routing instance to receive the network traffic via the particular component, that may be associated with a particular routing metric value (e.g., as compared to other components of the first routing instance) and/or includes an interface that is capable of reaching a destination device. In this way, implementations described herein reduce an amount of internal switching fabric traversals that may be caused by a component of the first routing instance forwarding the network traffic to another component of the first routing instance. Additionally, in this way, implementations described herein may conserve processor and/or memory resources of routing instances associated with an MSE device, and/or may conserve network resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a first routing instance; and
a second routing instance,
wherein the first routing instance is implemented at least partially in hardware to:
receive, from the second routing instance, forwarding information identifying a next-hop;
receive, via a component of the first routing instance, network traffic;
determine, based on the network traffic and the forwarding information, an interface to a component of the second routing instance; and
provide, to the component of the second routing instance, the network traffic via the interface,
the second routing instance to provide the network traffic to the next-hop.

2. The device of claim 1, where the next-hop is a first next-hop, and
where the first routing instance is further to:
perform a first lookup, using a routing table, based on the network traffic;
identify a second next-hop based on the first lookup, the second next-hop identifying the second routing instance;
perform a second lookup based on the second next-hop;
identify a third next-hop based on the second lookup, the third next-hop identifying the component of the second routing instance;
perform a third lookup based on the third next-hop;
identify a fourth next-hop based on the third lookup, the fourth next-hop identifying the interface; and
where the first routing instance, when determining the interface to the component of the second routing instance, is to:
determine the interface based on the third lookup.

3. The device of claim 1, where the forwarding information identifies the component of the second routing instance and the interface to the component of the second routing instance.

4. The device of claim 1, where the component of the second routing instance is associated with a routing metric value that satisfies a threshold; and
where the first routing instance, when receiving, from the second routing instance, the forwarding information identifying the next-hop, is to:
receive the forwarding information based on the component of the second routing instance being associated with the routing metric value that satisfies the threshold,
the forwarding information identifying the component of the second routing instance and the interface.

5. The device of claim 1, where the next-hop is a first next-hop and the forwarding information is first forwarding information; and
where the first routing instance is to:
receive, from the second routing instance, second forwarding information that identifies a second next-hop,
the second next-hop being associated with a service function chain;
determine, based on the second forwarding information, another interface to the component of the second routing instance; and
provide, to the component of the second routing instance, other network traffic,
the other network traffic being associated with a network service header that includes information associated with the service function chain.

6. The device of claim 1, where the component of the second routing instance is a line card associated with the second routing instance.

7. The device of claim 1, where the component of the first routing instance is at least one of:
a virtual machine,
a container, or
a standalone application capable of running on an operating system.

8. A non-transitory computer-readable medium storing instructions, the instructions comprising:
one or more instructions that, when executed by a first routing instance, implemented at least partially in hardware, cause the first routing instance to:
receive, from a second routing instance, forwarding information identifying a first next-hop,
the forwarding information identifying a component, and an interface to the component, of the second routing instance as a second next-hop;

receive network traffic,
  the network traffic being associated with the first next-hop;
determine, based on the network traffic and the forwarding information, the interface to the component of the second routing instance; and
provide, to the component of the second routing instance, the network traffic via the interface,
  the component of the second routing instance to forward the network traffic to the first next-hop.

9. The non-transitory computer-readable medium of claim 8, where the one or more instructions, when executed by the first routing instance, further cause the first routing instance to:
determine, based on the network traffic, that the network traffic is to be provided to a tunnel endpoint device;
determine, based on the tunnel endpoint device, a third next-hop;
determine, based on the third next-hop, the first next-hop;
determine, based on the first next-hop, the second next-hop; and
where the one or more instructions, that cause the first routing instance to provide the network traffic, cause the first routing instance to:
  provide the network traffic based on determining the second next-hop.

10. The non-transitory computer-readable medium of claim 8, where the one or more instructions, when executed by the first routing instance, further cause the first routing instance to:
store the forwarding information in a first forwarding table,
  the first forwarding table being associated with the first routing instance,
  the second routing instance to forward the network traffic based on a second forwarding table that is different than the first forwarding table.

11. The non-transitory computer-readable medium of claim 8, where the forwarding information identifies an external interface associated with the second routing instance, and where the interface is an internal interface of a device that includes the first routing instance and the second routing instance.

12. The non-transitory computer-readable medium of claim 8, where the one or more instructions, when executed by the first routing instance, further cause the first routing instance to:
determine, based on the network traffic, a third next-hop,
  the third next-hop being associated with a service forwarder device; and
where the one or more instructions, that cause the first routing instance to determine the interface to the component of the second routing instance, cause the first routing instance to:
  determine the interface to the component based on the service forwarder device.

13. The non-transitory computer-readable medium of claim 8, where the one or more instructions, when executed by the first routing instance, further cause the first routing instance to:
determine that the component is associated with a routing metric value that satisfies a threshold; and
where the one or more instructions, that cause the first routing instance to receive the forwarding information, cause the first routing instance to:
  receive the forwarding information based on the routing metric value satisfying the threshold.

14. The non-transitory computer-readable medium of claim 8, where the one or more instructions, when executed by the first routing instance, further cause the first routing instance to:
determine that the network traffic includes a label; and
where the one or more instructions, that cause the first routing instance to provide the network traffic via the interface, cause the first routing instance to:
  provide the network traffic via the interface based on the label.

15. A method, comprising:
receiving, by a first routing instance of a device, forwarding information,
  the forwarding information being provided by a second routing instance of the device;
receiving, by a component of the first routing instance of the device, network traffic;
determining, by the first routing instance of the device, an interface to a component of the second routing instance; and
providing, by the first routing instance of the device, the network traffic to the component of the second routing instance via the interface,
  the second routing instance to forward the network traffic to another device connected to the device.

16. The method of claim 15, further comprising:
determining, by the second routing instance of the device, that the component of the second routing instance is associated with a routing metric value that satisfies a threshold; and
providing, by the second routing instance of the device, the forwarding information based on the component of the second routing instance being associated with the routing metric value that satisfies the threshold.

17. The method of claim 15, further comprising:
determining, by the first routing instance of the device, a first next-hop based on the network traffic,
  the first next-hop identifying the other device;
determining, by the first routing instance of the device, a second next-hop based on the first next-hop,
  the second next-hop identifying the interface to the component of the second routing instance; and
where providing the network traffic to the component of the second routing instance comprises:
  providing the network traffic to the component of the second routing instance based on determining the second next-hop.

18. The method of claim 15, further comprising:
determining that the network traffic includes a label; and
where providing the network traffic via the interface comprises:
  providing the network traffic via the interface based on the label.

19. The method of claim 15, where the first routing instance and the second routing instance are at least one of:
a virtual machine,
a container, or
a standalone application capable of running on an operating system.

20. The method of claim 15, where the component of the first routing instance is to receive the network traffic from a customer edge device, and where the component of the second routing instance is to provide the network traffic to a provider edge device.

* * * * *